(12) United States Patent
Klemme et al.

(10) Patent No.: US 12,541,011 B2
(45) Date of Patent: Feb. 3, 2026

(54) FAST Q SWITCHED LASER WITH ADAPTIVE BRAGG GRATING STRUCTURE

(71) Applicant: Luminar Technologies, Inc., Orlando, FL (US)

(72) Inventors: Daniel Joseph Klemme, Robbinsdale, MN (US); Daniel Aaron Mohr, Saint Paul, MN (US)

(73) Assignee: Luminar Technologies, Inc., Orlando, FL (US)

( * ) Notice: Subject to any disclaimer, the term of this patent is extended or adjusted under 35 U.S.C. 154(b) by 829 days.

(21) Appl. No.: 17/897,403

(22) Filed: Aug. 29, 2022

(65) Prior Publication Data

US 2023/0071905 A1   Mar. 9, 2023

Related U.S. Application Data

(60) Provisional application No. 63/240,548, filed on Sep. 3, 2021.

(51) Int. Cl.
  *G01S 7/481* (2006.01)
  *G01S 17/89* (2020.01)
  *G02B 5/18* (2006.01)

(52) U.S. Cl.
  CPC ............ *G01S 7/4817* (2013.01); *G01S 17/89* (2013.01); *G02B 5/1814* (2013.01)

(58) Field of Classification Search
  CPC ...... G01S 7/4817; G01S 17/89; G01S 7/4814; G01S 7/484; G01S 17/10; G01S 17/42; G02B 5/1814; G02B 5/1828
  See application file for complete search history.

(56) References Cited

U.S. PATENT DOCUMENTS

| | | | | |
|---|---|---|---|---|
| 4,174,504 A | * | 11/1979 | Chenausky | ........... H01S 3/1103 372/99 |
| 5,195,104 A | * | 3/1993 | Geiger | ..................... G02F 1/39 372/98 |
| 6,215,805 B1 | * | 4/2001 | Sartorius | ............... H01S 5/0625 372/27 |
| 6,743,488 B2 | | 6/2004 | Memarian et al. | |

(Continued)

FOREIGN PATENT DOCUMENTS

WO       2010139144 A1    9/2010

*Primary Examiner* — Isam A Alsomiri
(74) *Attorney, Agent, or Firm* — Van Pelt, Yi & James LLP (57) ABSTRACT

Method and apparatus for generating pulses in a light detection and ranging (LiDAR) system. In some embodiments, a resonance chamber is provided to recirculate electromagnetic radiation from a light source between a base mirror and an active laminated structure characterized as a Bragg grating structure and having interleaved passive and active layers. A Q-switch control circuit applies a voltage profile to the active layers to transition the active laminated structure between a charging state in which the electromagnetic radiation recirculates within the resonance chamber and a release state in which the electromagnetic radiation is transmitted through the active laminated structure as an emitted light pulse. The passive layers may be formed of a dielectric material. The active layers may be formed of a metal material such but not limited to Indium Tin Oxide (ITO), Lithium Niobate (LiNbO3), Barium Titanate (BaTiO3), doped Silicon (Si), or doped Germanium (Ge).

20 Claims, 6 Drawing Sheets

(56) References Cited

U.S. PATENT DOCUMENTS

| | | | |
|---|---|---|---|
| 7,199,928 B2* | 4/2007 | Uehara | G02F 1/0305 |
| | | | 359/590 |
| 7,548,671 B2 | 6/2009 | Wu et al. | |
| 7,672,346 B1 | 3/2010 | Bass et al. | |
| 8,526,471 B2 | 9/2013 | Chang-Hasnain et al. | |
| 8,656,879 B2 | 2/2014 | Ridderbusch | |
| 8,787,417 B2 | 7/2014 | Baets et al. | |
| 9,136,664 B2 | 9/2015 | Herden et al. | |
| 9,810,775 B1* | 11/2017 | Welford | G01S 17/10 |
| 9,862,640 B2 | 1/2018 | Pfaff et al. | |
| 9,953,579 B2 | 4/2018 | Kim et al. | |
| 10,048,499 B2 | 8/2018 | Amitai | |
| 10,193,632 B2 | 1/2019 | Sorin et al. | |
| 11,175,512 B2 | 11/2021 | Waldern et al. | |
| 11,177,627 B2 | 11/2021 | Zilkie et al. | |
| 11,340,479 B2 | 5/2022 | Chowdhury et al. | |
| 2003/0161358 A1* | 8/2003 | Mueller | H01S 3/08009 |
| | | | 372/10 |
| 2004/0228564 A1 | 11/2004 | Gunn, III et al. | |
| 2007/0071061 A1 | 3/2007 | Pietra et al. | |
| 2009/0059967 A1* | 3/2009 | Chiang | H01S 3/115 |
| | | | 372/12 |
| 2011/0164308 A1* | 7/2011 | Arsenault | G02F 1/0128 |
| | | | 359/322 |

* cited by examiner

FAST Q SWITCHED LASER WITH ADAPTIVE BRAGG GRATING STRUCTURE

RELATED APPLICATION

The present application makes a claim of domestic priority under 35 U.S.C. 119(e) to U.S. Provisional Patent Application No. 63/240,548 filed Sep. 3, 2021, the contents of which are hereby incorporated by reference.

SUMMARY

Various embodiments of the present disclosure are generally directed to a method and apparatus for adaptively adjusting an output system to emit light pulses in an active light detection system.

Without limitation, some embodiments provide a resonance chamber to recirculate electromagnetic radiation from a light source between a base mirror and an active laminated structure. The active laminated structure may be characterized as a Bragg grating structure and has one or more interleaved passive and active layers. A Q-switch control circuit applies a voltage profile to the one or more active layers to transition the active laminated structure between a charging state in which the electromagnetic radiation recirculates within the resonance chamber and a release state in which the electromagnetic radiation is emitted through the active laminated structure as an emitted light pulse. The passive layer(s) may be formed of a dielectric material. The active layer(s) may be formed of a suitable metal based material such as but not limited to Iridium Tin Oxide (ITO), Lithium Niobate (LiNbO3), Barium Titanate (BaTiO3), doped Silicon (Si), and/or doped Germanium (Ge).

These and other features and advantages of various embodiments can be understood from a review of the following detailed description in conjunction with a review of the accompanying drawings.

DETAILED DESCRIPTION

Various embodiments of the present disclosure are generally directed to optimization of the operation of an active light detection system.

Light Detection and Ranging (LiDAR) systems are useful in a number of applications in which range information (e.g., distance, velocity, etc.) regarding a target is detected by irradiating the target with electromagnetic radiation in the form of light. The range information is determined in relation to timing characteristics of reflected light received back by the system. LiDAR applications include topographical mapping, guidance, surveying, and so on. One increasingly popular application for LiDAR is in the area of autonomously piloted or driver assisted vehicle guidance systems (e.g., self driving cars, autonomous drones, etc.). While not limiting, the light wavelengths used in a typical LiDAR system may range from ultraviolet to near infrared (e.g., 250 nanometers, nm to 1500 nm or more). Other wavelength ranges can be used.

So-called Q-Switched Lasers are generally known in the art as light emitting systems that include a laser (or other light source) and a resonator characterized as an interior mirrored resonance chamber that retains the light from the laser until a switching event happens, after which very fast and very short light pulses are emitted. A number of different Q-switched system configurations have been proposed in the art.

One prior art technique uses a passive saturable absorber which absorbs light at low light power. When the accumulated light power reaches a predetermined level, the absorber becomes transparent and transmits/releases the light. While operable, saturable absorbers tend to be unstable and difficult to control, as well as fail to provide emission characteristics at the levels required by many modern applications.

Another prior art solution uses an active Acousto-Optic Modulator (AOM). An AOM generally operates by applying a high frequency acoustic signal to a medium to modulate the refractive characteristics of the medium. This allows the AOM to impede or transmit power from the resonance chamber in a controlled fashion. However, AOM based solutions tend to be bulky, expensive, and fail to provide acceptable levels of performance.

Accordingly, various embodiments of the present disclosure are generally directed to an improved Q-switched laser system and associated method for transmitting very high frequency and very short duration pulses. As explained below, some embodiments provide an adaptive refractive system such as a Bragg Grating Mirror (BGM) arrangement to provide an electrically tunable mirror whose reflection properties can be changed very quickly such as through application of a voltage which will allow short, controllable pulses from a laser system.

While not limiting, some embodiments form the BGM structure from a laminated structure of active and passive layers. The active layers may be constructed of a suitable metal based material. The passive dielectric layers are formed of a suitable transparent and electrically insulative material. Any number of intervening passive and active layers can be used as desired, including tens of each type of layer, depending on the requirements of a given application.

In this way, a resonance chamber can be constructed that includes an adaptive laminated mirror structure with one, and in many cases multiple, sets of both dielectric passive layers and active layers. A controllably variable voltage source is coupled to the various active layers in the adaptive laminated mirror structure.

Both charging and active states (modes) are contemplated. During a charging state, the applied voltage to the adaptive laminated mirror structure is established at a level such that the emitted energy from the laser is reflected within and retained by the resonance chamber. An interior gain medium within the resonance chamber can provide amplification of the resonating light energy.

At such time that a pulse is desired to be emitted, a different applied voltage is supplied to the respective active layers of the adaptive laminated mirror structure, thereby enabling a high frequency, low duration pulse to be emitted from the resonance chamber. Any number of different waveform characteristics can be generated and emitted by the system in accordance with various operational applications.

Figure 1:
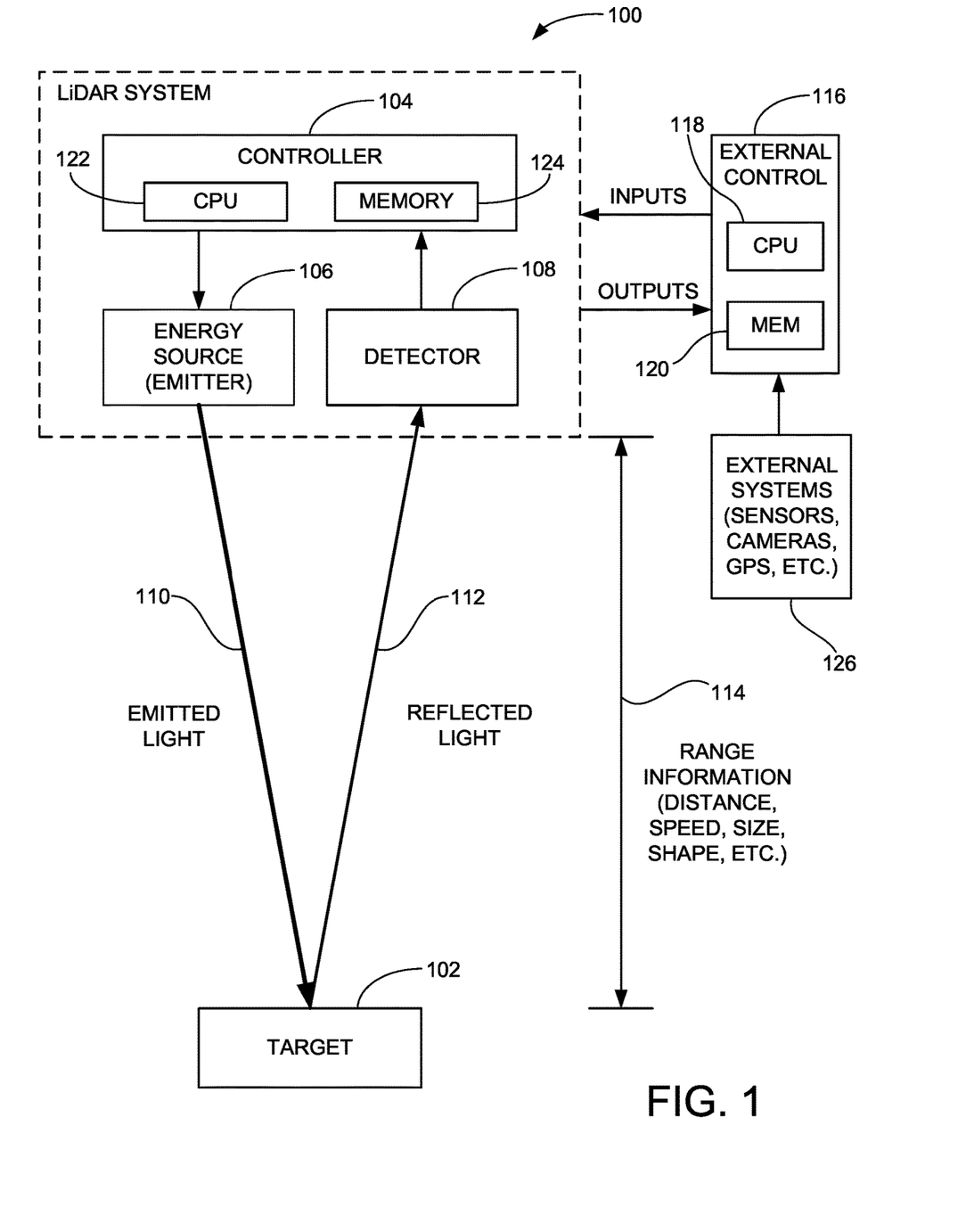
FIG. 1 is a block representation of a Light Detection and Ranging (LiDAR) system constructed and operated in accordance with various embodiments of the present disclosure.

To this end, FIG. 1 provides a generalized representation of a LiDAR system 100 constructed and operated in accordance with various embodiments. The LiDAR system 100 is configured to obtain range information regarding a target 102 that is a physical element located distal from the system 100. The range information can be beneficial for a number of areas and applications including but not limited to topography, archeology, geology, surveying, geography, forestry, seismology, atmospheric physics, laser guidance, automated driving and guidance systems, closed-loop control systems, etc.

The LiDAR system 100 includes a controller 104 which provides top level control of the system. The controller 104 can take any number of desired configurations, including hardware and/or software. In some cases, the controller can include the use of one or more programmable processors with associated programming (e.g., software, firmware) stored in a local memory which provides instructions that are executed by the programmable processor(s) during operation. Other forms of controllers can be used, including hardware based controllers, digital signal processors (DSPs), field programmable gate arrays (FPGAs), system on chip (SOC) integrated circuits, application specific integrated circuits (ASICs), gate logic, reduced instruction set computers (RISCs), etc.

An energy source circuit 106, also sometimes referred to as an emitter or a transmitter, operates to direct electromagnetic radiation in the form of light pulses toward the target 102. A detector circuit 108, also sometimes referred to as a receiver or a sensor, senses reflected light pulses received back from the target 102. The controller 104 directs operation of the emitted light from the emitter 106, denoted by arrow 110, and decodes information from the reflected light obtained back from the target, as denoted by arrow 112.

Arrow 114 depicts the actual, true range information associated with the intervening distance (or other range parameter) between the LiDAR system 100 and the target 102. Depending on the configuration of the system, the range information can include the relative or absolute speed, velocity, acceleration, distance, size, location, reflectivity, color, surface features and/or other characteristics of the target 102 with respect to the system 100.

The decoded range information can be used to carry out any number of useful operations, such as controlling a motion, input or response of an autonomous vehicle, generating a topographical map, recording data into a data structure for further analysis and/or operations, etc. The controller 104 perform these operations directly, or can communicate the range information to an external control system 116 for further processing and/or use.

In some cases, inputs supplied by the external control system 116 can activate and configure the system to capture particular range information, which is then returned to the system 116 by the controller 104. The external system can take any number of suitable forms, and may include a system controller (such as CPU 118), local memory 120, etc. The external system may form a portion of a closed-loop control system and the range information output by the LiDAR system 100 can be used by the external system 116 to adjust the position of a moveable element.

As noted above, the controller 104 can take a number of forms. In some embodiments, the controller 104 incorporates one or more programmable processors (CPU) 122 that execute program instructions in the form of software/firmware stored in a local memory 124, and which communicate with the external controller 118.

An additional number of systems 126 can provide information to the external control system 116 and/or the LiDAR system 100. The external sensors can take any number of forms including but not limited to environmental sensors (e.g., temperature sensors, moisture sensors, timers, ambient light level sensors, ice detectors, etc.), cameras, geopositioning systems (e.g., global positioning systems, GPS), radar systems, proximity sensors, speedometers, etc.

Figure 2:
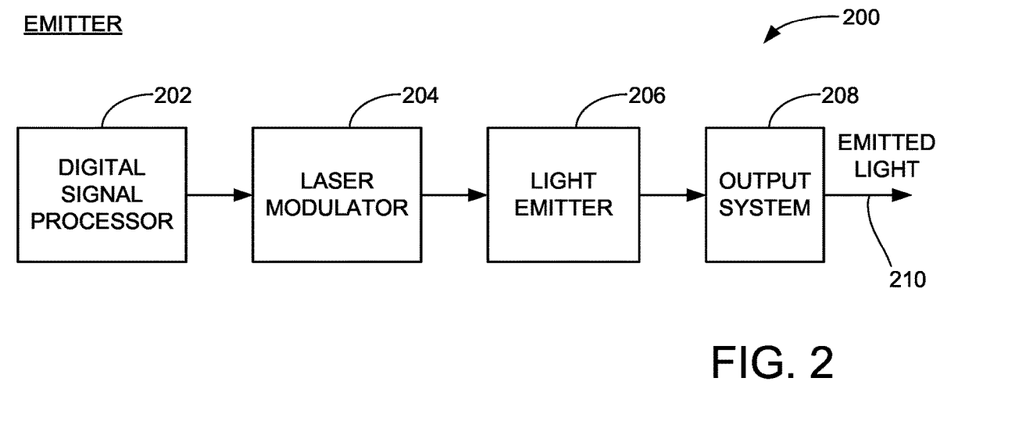
FIG. 2 is a simplified functional representation of an emitter of FIG. 1 constructed and operated in accordance with some embodiments.

FIG. 2 depicts an emitter circuit 200 incorporated into the system 100 of FIG. 1 in some embodiments. Other arrangements can be used so the configuration of FIG. 2 is merely illustrative and is not limiting. The emitter circuit 200 includes a digital signal processor (DSP) 202 that provides adjusted inputs to a laser modulator 204, which in turn adjusts a light emitter 206 (e.g., a laser, a laser diode, etc.) that emits electromagnetic radiation (e.g. light) in a desired spectrum. The emitted light is processed by an output system 208 to issue a beam of emitted light 210. The light may be in the form of pulses, coherent light, non-coherent light, swept light, etc. The output system can take any number of suitable forms including solid-state arrays, rotating polygons, micro-mirror actuated systems, etc. Scanning can take place in one or multiple axial directions.

Figure 3:
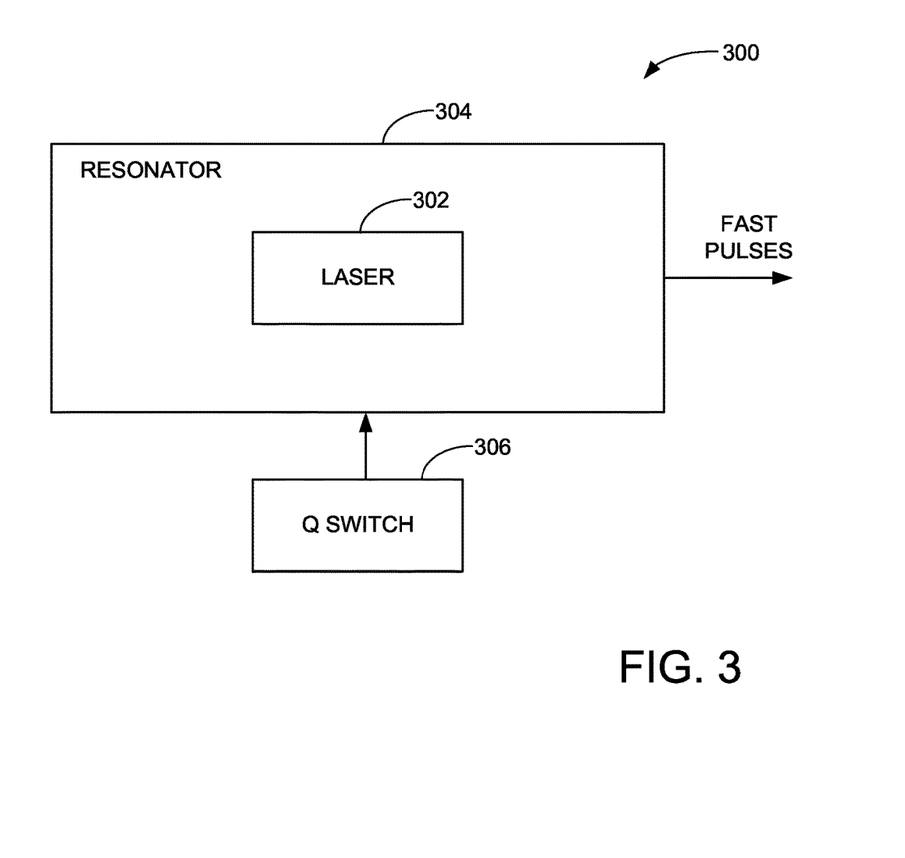
FIG. 3 shows a general representation of a fast Q switched laser emitter system that can be incorporated into the emitter systems of FIGS. 1-2 in accordance with some embodiments.

FIG. 3 is a simplified functional representation of a Q-switched laser system 300 constructed and operated in accordance with various embodiments of the present disclosure. It is contemplated that the system 300 is incorporated into the emitter 200 of FIG. 2. Other configurations can be used.

The system 300 includes a laser 302, a resonator 304 and a switching/control circuit 306. The circuit 306 is also sometimes referred to as a Q switch or a switch controller. The resonator 304 comprises a resonating chamber with multiple reflective surfaces. Electromagnetic radiation emitted by the laser 302 is maintained within the resonating chamber 304 until such time that a triggering signal is provided by the switch circuit 306, after which a pulse is emitted from the chamber.

The emitted pulse is output for downrange illumination and detection as described above in FIG. 1. The pulses emitted by the system 300 are characterized as very short duration, very high frequency pulses. The pulses may be on the scale of a few nanoseconds in length and a few hundred Terrahertz in frequency, etc. Other pulse configurations can be utilized, however, so these values are merely exemplary and are not limiting.

The system 300 utilizes an adaptive Bragg grating structure having multiple laminated layers of active and passive materials. The structure is configured to have specially configured reflection/transmission properties engineered by design of the two material layer optical properties, as well as other features such as dimensional characteristics (e.g., length, width, thickness, etc.). While configurations having two distinctive types of materials (e.g., passive and active) are contemplated, this is merely exemplary and is not limiting; other configurations have more than two different types of passive and/or active layers as required.

The various active and passive layers can take any number of different configurations based on the requirements of a given application. In some cases, Indium Tin Oxide (ITO) is a material whose optical properties can be modified by application of a voltage, and is therefore a particularly suitable material for inclusion within the respective active layers. The passive layers are formed of any number of suitable dielectric materials, including but not limited to polycarbonate, glass, silicon nitride, etc.

Figure 4:
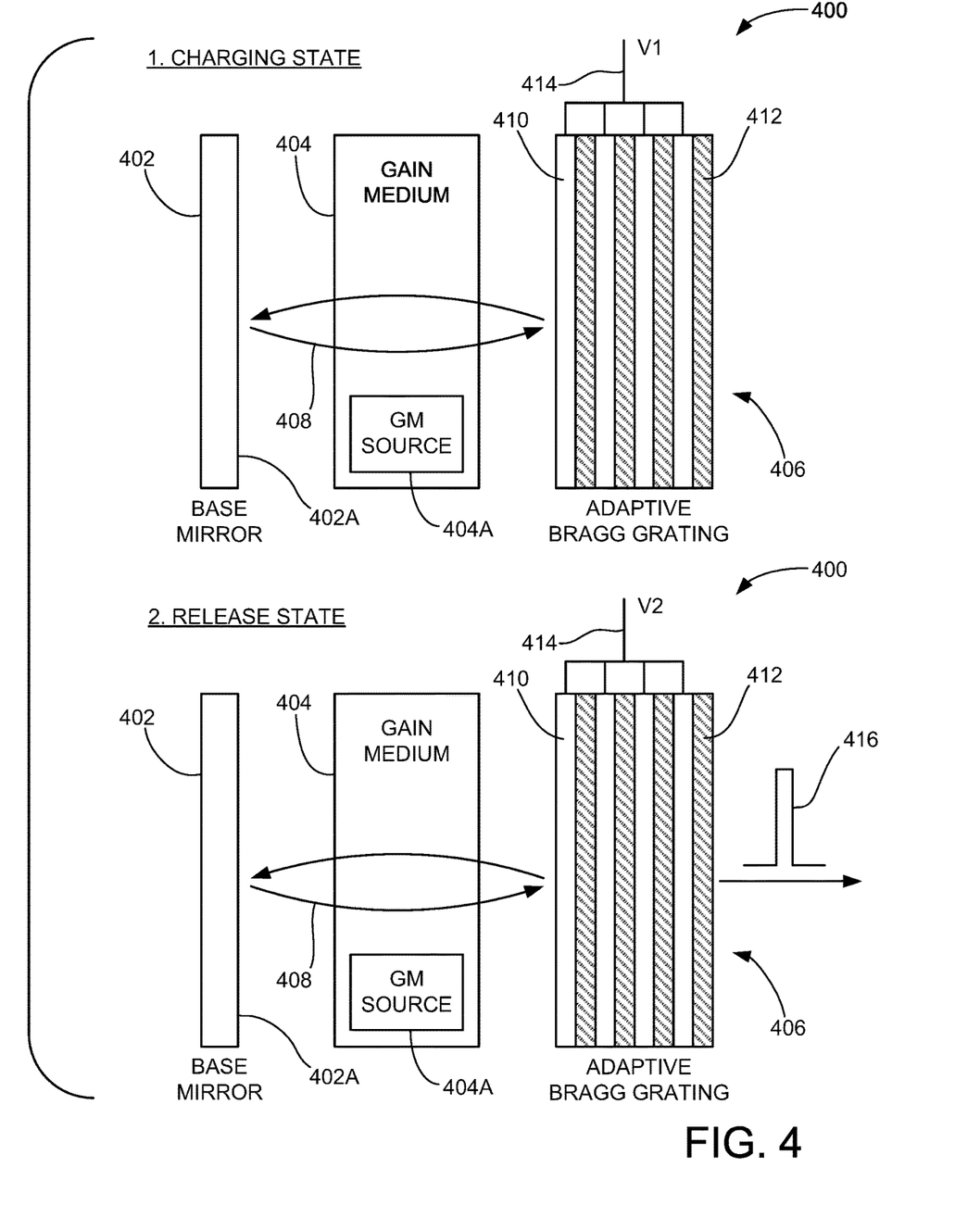
FIG. 4 shows an embodiment of the system of FIG. 3 in further detail to illustrate respective charging and release states to emit electromagnetic radiation in the form of light pulses in accordance with some embodiments.

FIG. 4 shows aspects of a resonance chamber 400 corresponding to the system of FIG. 3 in accordance with some embodiments. The chamber 400 is operable between respective charging (1) and release (2) states to emit electromagnetic radiation in the form of light pulses in a LiDAR system such as 100 in FIG. 1.

The chamber 400 includes a high reflectance base mirror 402, a gain medium 404 and an adaptive Bragg grating structure 406 (also referred to as an active laminated structure). Other elements such as a laser diode source, refractive lenses, etc. have been omitted for purposes of clarity, but can be incorporated into the system as required. It will be appreciated that the chamber 400 generally corresponds to the resonator 304 described above in FIG. 3.

The base mirror 402 is a stationary mirror with a high reflectance value. An interior facing surface of the base mirror 402, denoted at 402A, may be concave to further enhance reflective efficiency. The gain medium 404 may include internal or external electronic pump circuitry (denoted as GM source circuitry 404A) to amplify recirculating light energy 410 established within the chamber 400 by the laser diode or other light source (not shown) during the charging state. While useful in obtaining amplification of the recirculating light, the use of a gain medium within the chamber is not necessarily required.

The adaptive Bragg grating structure 406 is a laminated thin film structure having respectively disposed, intervening active and passive layers 410 and 412. As noted above, the passive layers 410 are formed of a suitable dielectric material with selected reflectance properties such as polycarbonate, glass, silicon nitride or other material. The active layers 412 are formed of a metal or associated alloy material with selectively controllable refractive properties that are achieve responsive to the application of a suitable voltage. Materials from which the active layers 412 can be formed include, but are not limited to, Iridium Tin Oxide (ITO), Lithium Niobate (LiNbO3), Barium Titanate (BaTiO3), doped Silicon (Si), and doped Germanium (Ge). Other materials may be utilized as well, so this listing is merely exemplary and is not limiting.

Conductors 414 interconnect the respective active layers 412 to a voltage source (not separately shown) to supply respective voltages to the structure 406; these voltages are identified as voltage V1 during charging and voltage V2 during pulse release. These respective voltages can take any number of suitable forms including steady state and pulsed voltages as required.

The simplified diagram of FIG. 4 uses four (4) each of the respective passive layers 410 and active layers 412 to provide a (4, 4) arrangement. Other respective numbers of passive and active layers can be utilized as desired, including but not limited to arrangements of (8, 8), (16, 16), (32, 32), and so on. It is not necessarily required that the numbers of intervening layers be the same; for example, another embodiment contemplates 17 passive layers and 16 intervening active layers for a (17, 16) arrangement, etc. The respective layers 410, 412 can have nominally the same overall length, width and thickness dimensions, or can have different dimensions as required.

In further embodiments, the respective layers of a given type (e.g., active or passive) can have different dimensions within the laminated structure. For example, one active layer within the structure may have a first thickness and a second active layer may have a larger, second thickness. Different voltages may be supplied to these respective layers during transition to the release state. Other alternatives will readily occur to the skilled artisan in view of the present disclosure.

The general idea of the adaptive Bragg grating structure 406 is that the device operates as a Bragg grating mirror structure to enable the build up of energy within the chamber 400, after which the structure is actively switched (transitioned) at the appropriate time to a transmission structure to allow emission of at least a portion of the accumulated energy in the form of an output pulse. The use of multiple layers of active and passive layers can enable the structure to be made up of dielectric or weak metal structures that have the desired refractive index (RI) values in both the non-activated (e.g., voltage V1) state and the activated (e.g., voltage V2) states.

The applied activation voltages (e.g., voltage V2) will vary, but it is contemplated that applied voltage pulses in the range of around 10-20 volts may be sufficient to change the RI values of the active layers to convert the layers from absorptive/reflective to absorptive/transmissive in the manner described herein. Stated another way, the applied activation voltage will induce a change in RI value of the active layers in the thin film stack so that the refractive, phase shift and absorptive characteristics of the material are changed to transition the material from reflection to transmission states.

Figure 5:
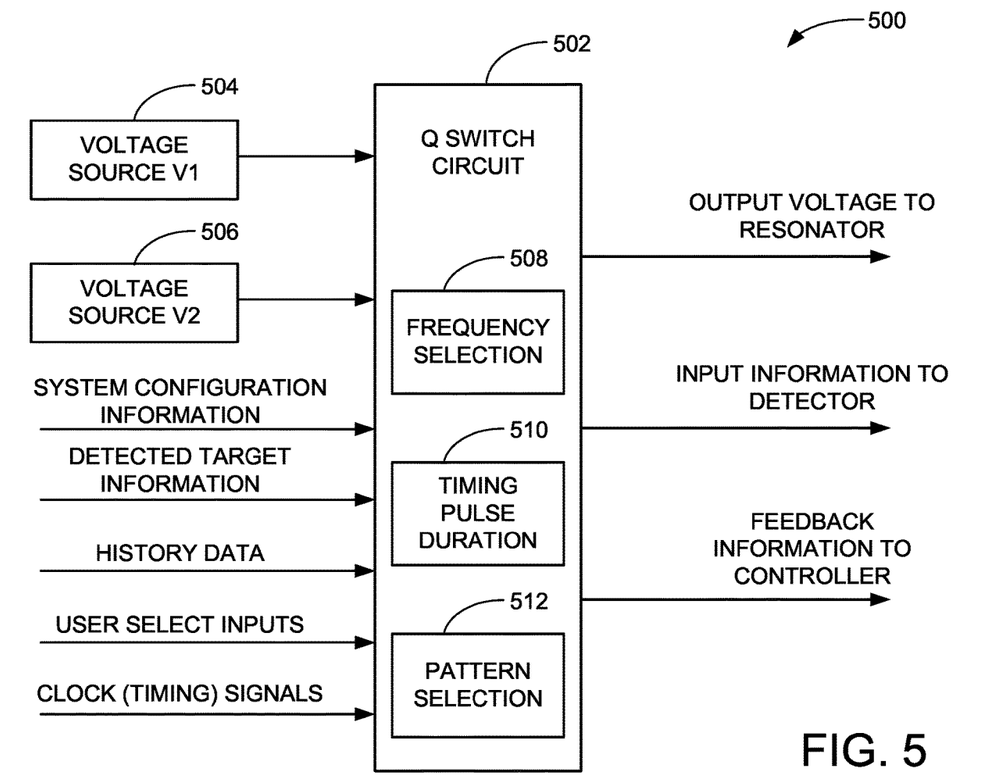
FIG. 5 shows the Q switch circuitry of FIG. 4 in greater detail in accordance with some embodiments.

FIG. 5 shows a functional block representation of a control circuit 500 utilized in accordance with some embodiments to drive a Q-based resonance chamber such as depicted in FIGS. 3-4. The control circuit 500 includes a switching circuit 502, also referred to as a Q-switch circuit, that receives a number of external inputs including respective voltages V1 and V2 from associated sources 504, 506.

In some embodiments, the V1 voltage in the charging state (1) in FIG. 4 may be nominally zero volts, and the V2 voltage in the release state (2) in FIG. 4 may be some non-zero magnitude of positive or negative voltage sufficient to transition the respective active layers 412 to a transmissive state. The magnitudes and other pulse characteristics of the respective source voltages will depend on a number of factors including the material from which the active layers are formed, the respective dimensions thereof, the desired output pulse characteristics from the emitter, and so on. In some cases, the voltage sources 504, 506 may be rail voltages and the Q-switch circuit 502 uses a charge pump or other internal circuitry to generate and output the desired voltage levels to the active layers in the form of fast pulses at the desired rate.

Other inputs that are shown supplied to the Q-switch circuit 502 can include system configuration information, detected target information, history data, user selected inputs, clock (timing) signals, and so on. These are merely illustrative and are not limiting, as other forms of inputs can be used as required. It is contemplated that the Q-switch circuit will operate in a closed loop fashion to output pulses as required based on timing information generated by the emitter 200.

The various outputs generated by the Q-switch circuit 502 include output voltages to the resonator (e.g., the active layers 412 in FIG. 4), input information to the detector with regard to timing and other related information, and feedback information to the overall system controller. As before, other forms of outputs can be generated as required.

These and other outputs from the Q-switch circuit 502 can be generated using various circuits including a frequency selection block 508, a timing pulse duration block 510 and a pattern selection block 512. While not necessarily required, the Q-switch circuit 502 can further supply power to the gain medium (see e.g., GM source circuitry 404A in FIG. 4) to provide the requisite amplification of the recirculating electromagnetic energy within the resonance chamber.

Figure 6:
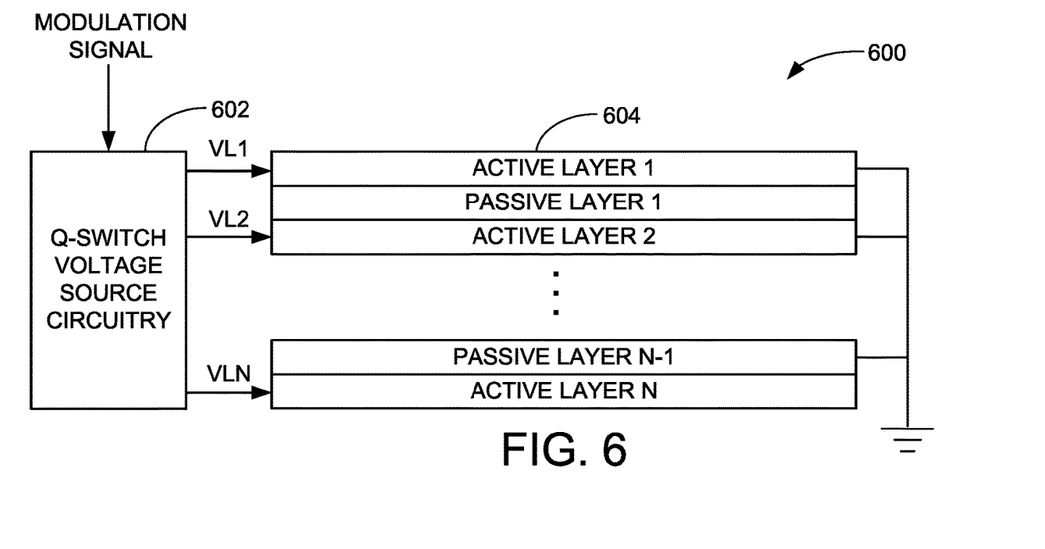
FIG. 6 shows further aspects of Q-switch voltage source circuitry of FIG. 5 in further embodiments.

FIG. 6 shows a voltage circuit 600 that can be incorporated into the controller 500 of FIG. 5 in some embodiments. A Q-switch voltage circuit 602 provides voltages to each of a number of active layers 604 denoted as layers 1 to N. The layers 604 generally correspond to the layers 412 described above, and the voltages are identified as switching voltage pulses VL1 through VLN. The same switching voltage pulses may be supplied to each of the layers 604 concurrently, or different pulses with different magnitudes, timing and pulse characteristics may be supplied to each of the layers as required.

Figures 7A, 7B:
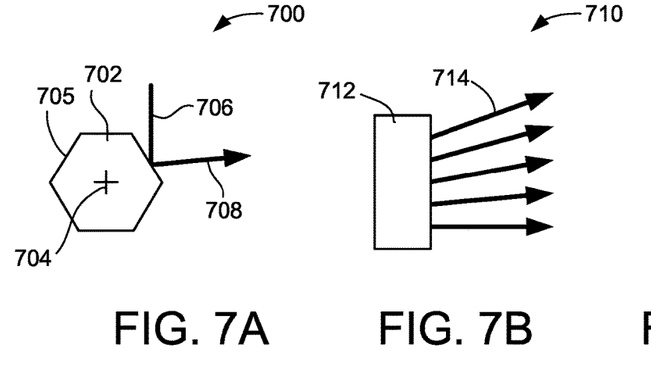
FIGS. 7A through 7C show different output systems of the various embodiments to direct pulses generated by the system of FIGS. 5-6 in some embodiments.
Figure 7C:
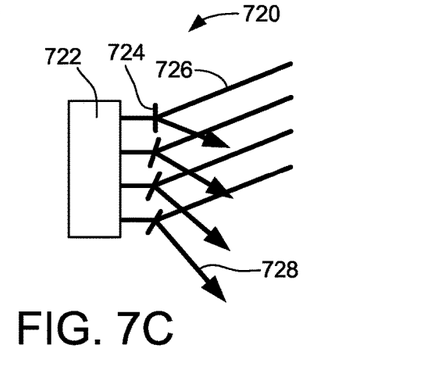

FIGS. 7A through 7C show additional aspects of various embodiments that utilize Q-switching techniques as embodied herein. Other configurations can be used. FIG. 7A shows a system 700 that includes a rotatable polygon 702 which is mechanically rotated about a central axis 704 at a desired rotational rate to controllably direct light pulses output by the respective Q-switched systems of FIGS. 3-6.

The polygon 702 has reflective outer surfaces 705 adapted to direct incident light 706 as a reflected stream 708 at a selected angle responsive to the rotational orientation of the polygon 702. The polygon is characterized as a hexagon with six reflective sides, but any number of different configurations can be used. By coordinating the impingement of the light pulses 706 with rotational angles of the polygon 702, the output light 708 can be swept across a desired field of view (FoV). Multiple polygons can be arranged along multiple orthogonal axes to provide a multidimensional scan pattern.

FIG. 7B provides a system 710 with a solid state array (integrated circuit device) 712 configured to emit light beams 714 at various selected angles across a desired FoV. Unlike the mechanical system of FIG. 7A, the solid state system of FIG. 7B has essentially no moving parts and instead scans the beam in relation to different wavelengths of the input light supplied as described above in FIGS. 3-6.

FIG. 7C shows a DLP (digital light processing) system 720 that employs a base substrate 722 that supports an array of micromirrors 724. Piezoelectric or other mechanisms can be used to deflect the micromirrors 724 and change an angle between incident light 726 and reflected light 728 to provide a desired scan pattern. As before, the parallel incident light 726 may be generated as described above in FIGS. 3-6 and angled as shown at 728 to scan the FoV.

Figure 8:
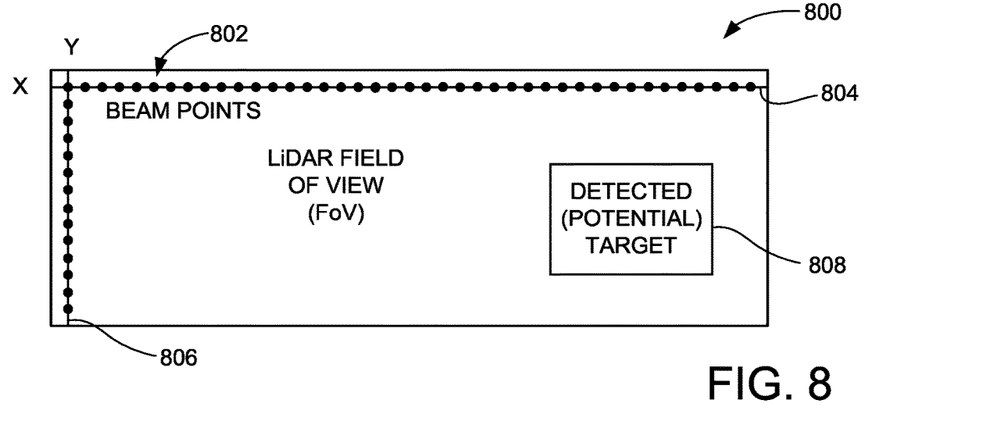
FIG. 8 depicts a detector corresponding to FIG. 1 configured to receive and process output pulses generated in accordance with various embodiments.

FIG. 8 shows an exemplary FoV 800 generated by the system 100 in accordance with some embodiments. The FoV 800 generally represents that portion of the down range detection area that can be sensed and tracked by the system through the emission and receipt of emitted light beams such as output in FIGS. 7A-7C.

The FoV 800 in FIG. 8 is generally rectangular in shape and arranged along orthogonal x-y axes. However, this is merely for purposes of illustration and is not limiting. Cartesian arrays are contemplated, but other arrangements can be used including but not limited to spherical or polar coordinates, multidimensional coordinates, single axis coordinates, etc. The FoV is scanned (rasterized) using beam points 802 arranged along respective rows 804 (x-axis) and columns 806 (y-axis). A detected target within the FoV 800 is generally denoted at 808.

Depending on the configuration of the system, each scan pattern will provide a frame (full rasterized pattern) that is repeated multiple times per second using the same scan pattern or a different scan pattern each time to provide many hundreds of thousands or millions of points per second. This can include many hundreds or thousands of points in each frame and many tens, hundreds or even thousands of frames per second. The resulting data can be used to generate a three-dimensional (3D) point cloud representation of the down range environment with each data point providing not only x and y coordinate points (or other FoV positions) but a distance (z axis) datum as well.

Figure 9:
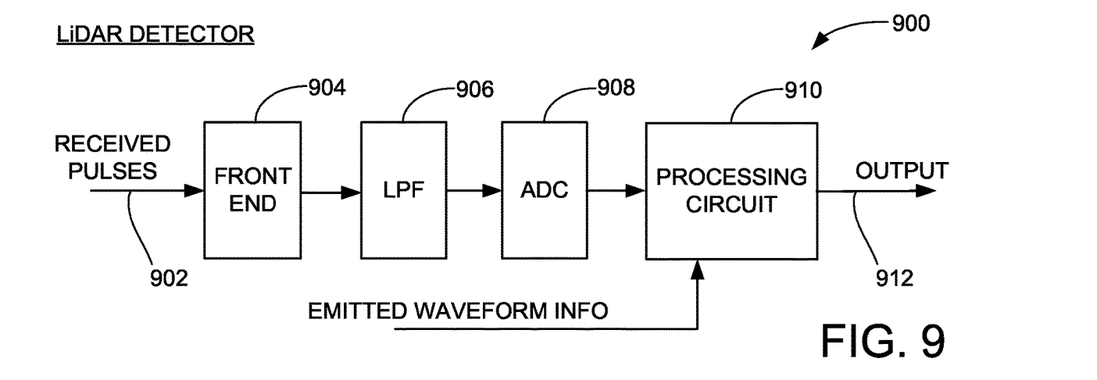
FIG. 9 is a field of view (FoV) scanned by the various emitters disclosed above that operate in accordance with various embodiments.

FIG. 9 provides a generalized representation of a detector circuit 900 configured to process reflected light from the FoV 800 in FIG. 8. The detector circuit 900 receives reflected pulses 902 which are processed by a suitable front end 904. The front end 904 can include optics, detector grids, amplifiers, mixers, and other suitable features to present input pulses reflected from the target. The particular configuration of the front end 904 is not germane to the present discussion, and so further details have not been included. It will be appreciated that multiple input detection channels can be utilized.

A low pass filter (LPF) 906 and an analog to digital converter (ADC) 908 can be used as desired to provide processing of the input pulses. A processing circuit 910 provides suitable signal processing operations to generate a useful output 912. It will be noted that timing information generated by or used by the Q-switch controller 500 in FIG. 5 may be forwarded to the processing circuit 910 to enable I/Q coherent light channel processing, although such is not necessarily required.

Figure 10:
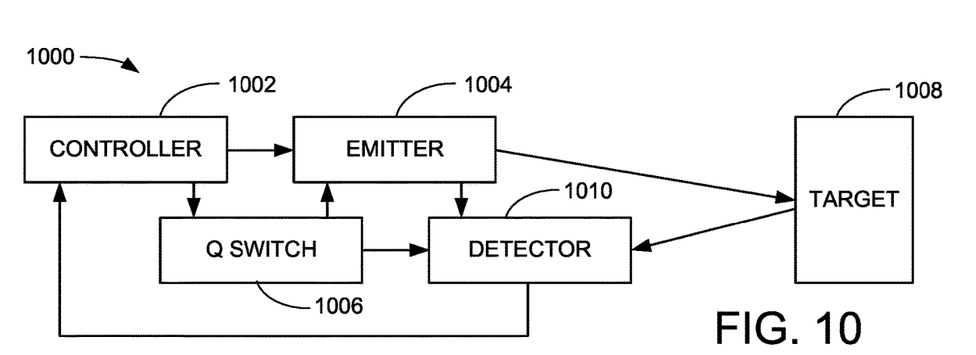
FIG. 10 is a processing circuit constructed and operated in accordance with various embodiments to emit and receive electromagnetic energy pulses.

FIG. 10 shows another LiDAR system 1000 generally similar to the system 100 in FIG. 1 in conjunction with a down range target 1002. The system 1000 includes a top level controller 1004, an emitter 1006, a Q-switch circuit (controller) 1008 and a detector 1010. The Q-switch circuit 1008 is depicted as a separate element to illustrate interaction paths that can take place during operation between the Q-switch and the other elements in the system. Other configurations can be used as desired.

Figure 11:
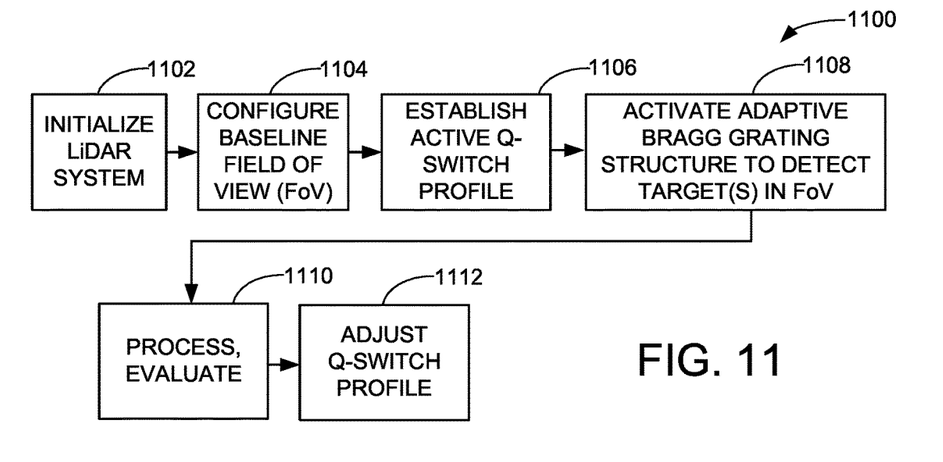
FIG. 11 is an operational sequence diagram to illustrate operational steps that can be carried out in accordance with various embodiments.

FIG. 11 is a sequence diagram 1100 to illustrate operational steps that can be carried out in accordance with the foregoing discussion. Other steps can be carried out so that the sequence is merely exemplary and is not limiting.

A LiDAR system such as described above in FIGS. 1-10 is initialized at block 1102. As part of this initialization process, a baseline field of view (FoV) can be selected at block 1104 and a baseline active Q-switch profile can be selected at 1106. Thereafter, the system commences with normal operation at block 1108, in which light pulses are emitted and various targets are detected as described above. The pulses are generated using an active laminated Bragg grating structure as set forth in FIGS. 4 and 6 which is switched using the profile determined in block 1106.

Block 1110 shows evaluation and processing of the detected, reflected light pulses, including actions that may be taken as necessary (e.g., course adjustments, data collection, etc.). As part of the system, a closed loop control approach may be utilized such that adjustments are made to adjust the active Q-switch profile to change the pulses emitted by the system. Without limitation, the profile may be changed for different target or other range information, environmental conditions, information from external sensors or other systems, etc.

By changing the voltage profile supplied to the active layers in the Bragg grating structure, different pulses with different waveform characteristics can be instantly output as desired. In this way, for example, higher resolution or different frequency/waveform pulses may be desired for a selected area within the FoV (such as the area of the detected target 808 in FIG. 8). These changes can be quickly and easily made through the Q-switch controller.

Figure 12:
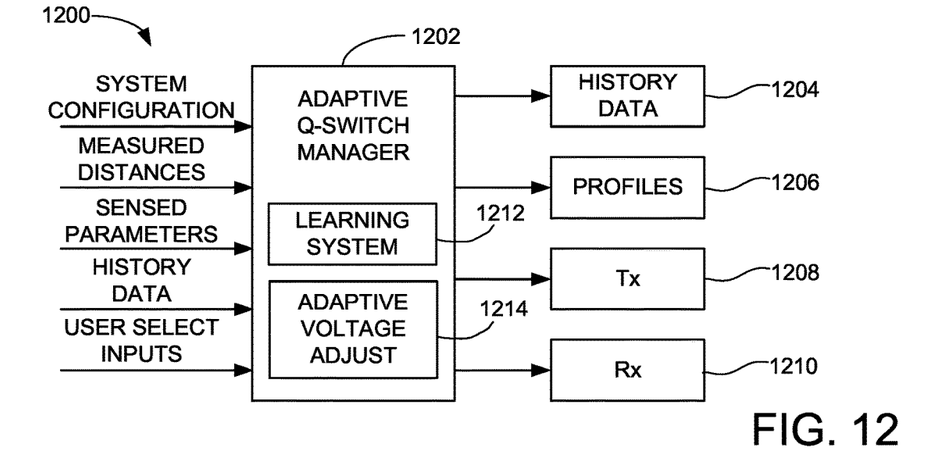
FIG. 12 is a functional block representation of an adaptive emitter control system constructed and operated in accordance with further embodiments.

FIG. 12 shows an adaptive emitter management system 1200 that can be incorporated in the respective LiDAR systems described above in accordance with further embodiments. The system 1200 includes an adaptive Q-switch manager circuit 1202, which can be realized in hardware, software and/or firmware. In some embodiments, at least some aspects of the circuit 1202 may be realized using one or more programmable processors and associated programming stored in a local memory.

The circuit 1202 can operate using a number of inputs including system configuration information, measured distances based on previous scans, sensed parameters (including environmental parameters, geoposition parameters, etc.), history data, and user selection mode inputs. Other inputs can be used as desired.

Outputs by the circuit 1202 can include the accumulation of history data 1204 and one or more operational profiles 1206 in local memory. Outputs are further provided to an emitter (transmitter, Tx) 1208 and a detector (receiver, Rx) 1210.

In further embodiments, a learning system 1212 such as a neural network, artificial intelligence (AI) circuit, etc. can be used to further attune the generation of profiles for use by the Q-switch circuit. An adaptive voltage adjustment circuit 1214 can further be employed to generate, and modify, the applied control voltages for the resonance chamber used to generate the emitted pulses.

It will now be appreciated that the various embodiments presented herein can provide a number of benefits. A Q-switched laser system can be provided with a resonance chamber with a specially configured laminated structure, such as a Bragg grating, with one or more active layers that can be actively switched to enable the system to generate very short duration, very high power pulses. The system can be realized at low cost, small form factor and high reliability and adaptive performance.

While coherent, I/Q based systems have been contemplated as a basic environment in which various embodiments can be practiced, such are not necessarily required. Similarly, while solid-state OPA outputs are particularly suitable for various embodiments, in alternative configurations other types of output systems can be employed, including mechanical systems such as galvanometers or rotatable polygons, micromirror technology, etc.

It is to be understood that even though numerous characteristics and advantages of various embodiments of the present disclosure have been set forth in the foregoing description, together with details of the structure and function of various embodiments of the disclosure, this detailed description is illustrative only, and changes may be made in detail, especially in matters of structure and arrangements of parts within the principles of the present disclosure to the full extent indicated by the broad general meaning of the terms in which the appended claims are expressed.

What is claimed is:

1. An apparatus comprising:
   a resonance chamber configured to receive electromagnetic radiation in the form of light from a light source, the resonance chamber comprising a base mirror at a first end, an active laminated structure at an opposing second end, and an intervening gain medium therebetween, the active laminated structure comprising at least one passive layer and at least one active layer; and
   a Q-switch control circuit configured to transition the active laminated structure between a charging state in which the electromagnetic radiation recirculates within the resonance chamber and a release state in which the electromagnetic radiation is transmitted through the active laminated structure as an emitted light pulse responsive to application of a control voltage profile to the at least one active layer.

2. The apparatus of claim 1, wherein the control voltage profile applied by the Q-switch control circuit to the at least one active layer comprises a first voltage during the charging state configured to place the at least one active layer in a high reflectance state and a different, second voltage during the release state configured to temporarily transition the at least one active layer to a low reflectance state.

3. The apparatus of claim 1, wherein the active laminated structure comprises a first number of passive layers and a second number of active layers, and wherein the control voltage profile comprises application of at least one voltage to to enact a change in a refractive index (RI) of each of the second number of active layers.

4. The apparatus of claim 3, wherein the first number is equal to the second number, and wherein the first number is greater than or equal to eight (8).

5. The apparatus of claim 3, wherein the first number is not equal to the second number, and wherein the second number is greater than or equal to eight (8).

6. The apparatus of claim 1, wherein each of the at least one active layer is formed of a metal based material having a mirrored surface characteristic responsive to application of a first voltage thereto and which transitions to a transparent surface characteristic responsive to application of a different, second voltage thereto.

7. The apparatus of claim 6, wherein the metal based material comprises at least a selected one of Indium Tin Oxide (ITO), Lithium Niobate ($LiNbO_3$), Barium Titanate ($BaTiO_3$), doped Silicon (Si), or doped Germanium (Ge).

8. The apparatus of claim 1, wherein each of the at least one passive layer is formed of a dielectric material having a low reflectance level.

9. The apparatus of claim 1, further comprising a laser diode coupled to the resonance chamber to generate the electromagnetic radiation.

10. The apparatus of claim 1, further comprising a gain medium source which supplies electrical energy to the gain medium to amplify the electromagnetic energy during the charging state.

11. The apparatus of claim 1, wherein the active laminated structure is characterized as a mirror during the charging state and is characterized as a translucent element during the release state.

12. The apparatus of claim 1, further comprising a detector configured to detect a target within a field of view (FoV) responsive to reflected light pulses passed through the active laminated structure during the release state.

13. The apparatus of claim 1, wherein the active laminated structure is characterized as an active Bragg grating structure.

14. A light detection and ranging (LiDAR) system, comprising:
 an emitter comprising:
  a light source configured to generate electromagnetic radiation in the form of light; and
  a resonance chamber configured to receive and recirculate the light between a base mirror at a first end and an active laminated structure at an opposing second end, the active laminated structure comprising a plurality of intervening passive layers and active layers to form an active Bragg grating structure;
 a Q-switch control circuit configured to apply a first voltage to the plurality of active layers to place the active laminated structure in a mirrored condition during a charging state and to apply a different, second voltage to the plurality of active layers to transition the active laminated structure in a transmissive state to emit a high frequency pulse; and
 a detector configured to obtain range information associated with a down range target responsive to the emitted high frequency pulse.

15. The LiDAR system of claim 13, wherein each of the active layers is formed of at least a selected one of Indium Tin Oxide (ITO) Lithium Niobate (LiNbO3), Barium Titanate (BaTiO3), doped Silicon (Si), or doped Germanium (Ge), and wherein each of the passive layers is formed of a dielectric material.

16. A method, comprising:
 introducing electromagnetic radiation in the form of light into a resonance chamber bounded by a base mirror at a first end and an active laminated structure at an opposing end, the active laminated structure comprising a passive layer and an active layer;
 applying a first voltage to the active layer during a charging state to retain the electromagnetic radiation within the resonance chamber; and
 subsequently applying a different, second voltage to the active layer during a release state to release the electromagnetic radiation through the active laminated structure as a high frequency light pulse.

17. The method of claim 16, further comprising detecting the high frequency light pulse after being reflected off of a target down range from the resonance chamber and determining range information therefrom associated with the target.

18. The method of claim 16, wherein the active layer is formed of at least a selected one of Indium Tin Oxide (ITO) Lithium Niobate (LiNbO3), Barium Titanate (BaTiO3), doped Silicon (Si), or doped Germanium (Ge), and wherein the passive layer is formed of a dielectric material.

19. The method of claim 16, further comprising using a gain medium within the resonance chamber to amplify the recirculating electromagnetic radiation during the charging state.

20. The method of claim 16, wherein the active laminated structure is characterized as an active Bragg grating structure comprising a plurality of passive layers interleaved with a corresponding plurality of active layers, and wherein the respective first and second voltages are respectively applied to each of the plurality of active layers to place the Bragg grating structure in a mirrored state and a transmissive state, respectively.

* * * * *